US008906577B2

(12) United States Patent
Ahn

(10) Patent No.: US 8,906,577 B2
(45) Date of Patent: Dec. 9, 2014

(54) HIGH PERFORMANCE FLAME FUEL CELL USING AN ANODE SUPPORTED SOLID-OXIDE FUEL CELL

(75) Inventor: Jeongmin Ahn, Manlius, NY (US)

(73) Assignee: Syracuse University, Syracuse, NY (US)

(*) Notice: Subject to any disclaimer, the term of this patent is extended or adjusted under 35 U.S.C. 154(b) by 56 days.

(21) Appl. No.: 13/537,850

(22) Filed: Jun. 29, 2012

(65) Prior Publication Data

US 2013/0011768 A1 Jan. 10, 2013

Related U.S. Application Data

(60) Provisional application No. 61/502,386, filed on Jun. 29, 2011.

(51) Int. Cl.

| | |
|---|---|
| ***H01M 8/22*** | (2006.01) |
| ***H01M 4/92*** | (2006.01) |
| ***H01M 8/12*** | (2006.01) |
| ***H01M 4/90*** | (2006.01) |
| *H01M 4/86* | (2006.01) |
| *H01M 8/06* | (2006.01) |

(52) U.S. Cl.

CPC .......... *H01M 8/1226* (2013.01); *H01M 4/8657* (2013.01); *H01M 4/92* (2013.01); *H01M 8/1253* (2013.01); *Y02E 60/525* (2013.01); *H01M 2008/1293* (2013.01); *H01M 4/9033* (2013.01); *H01M 2300/0094* (2013.01); *H01M 8/0631* (2013.01); *H01M 8/1213* (2013.01); *Y02E 60/523* (2013.01); *H01M 8/126* (2013.01); *H01M 4/9025* (2013.01); *H01M 8/0637* (2013.01)

USPC ........... 429/506; 429/505; 429/529; 429/528; 429/526; 429/524

(58) Field of Classification Search

USPC ................. 429/506, 505, 529, 528, 526, 524

See application file for complete search history.

(56) References Cited

U.S. PATENT DOCUMENTS

2009/0136821 A1* 5/2009 Gottmann et al. .............. 429/33

FOREIGN PATENT DOCUMENTS

JP 2009059533 A * 3/2009

OTHER PUBLICATIONS

B.C.H. Steele, P.H. Middleton, R.A. Rudkin, Material Science Aspects of SOFC Technology with Special Reference to Anode Development, Solid State Ionics, 1990, pp. 388-393, vol. 40/41, Elsevier Science Publishers B.V., North Holland.

E. Perry Murray, T.Tsai, S.A. Barnett, A Direct-Methane Fuel Cell with a Ceria-Based Anode, Letters to Nature, 1999, pp. 649-651, vol. 400, Macmillan Magazines Ltd.

(Continued)

*Primary Examiner* — Jane Rhee

(74) *Attorney, Agent, or Firm* — Frederick J. M. Price; George R. McGuire; Bond Schoeneck & King, PLLC

(57) ABSTRACT

The present invention relates to an anode supported solid-oxide fuel cell based flame fuel cell that enable the generation of both electricity and heat from a flame (i.e. flame is used as a heat source and a fuel source for the fuel cell's operation, while supplying a useful heat for other thermochemical systems) and, more particularly, to an anode supported solid-oxide fuel cell based flame fuel cell that uses hydrocarbon/air mixture as a fuel source and includes a catalyst layer that can act as a protective layer for the anode layer, an anode layer, a cathode layer, an electrolyte layer, and an interlayer between the cathode layer and the electrolyte layer.

13 Claims, 19 Drawing Sheets

Air Filter
$O_2$
Cathode
Electrolyte
Anode
$H_2$
CO
Air Filter
HERSHEY'S
Milk Chocolate
Feces Schematic illustration of a portable FFC power generation system

(56) References Cited

OTHER PUBLICATIONS

T. Hibino, A. Hashimoto, A Low-Operating-Temperature Solid Oxide Fuel Cell in Hydrocarbon-Air Mixtures, Science AAAS, 2000, pp. 2031-2033, vol. 288, American Association for the Advancement of Science, Washington, DC, United States of America.

Z. Shao, J. Mederos, W. Chueh, S. Haile, High Power-Density Single-Chamber Fuel Cells Operated on Methane, Journal of Power Sources, 2006, pp. 589-596, vol. 162, Elsevier Science Publishers B.V.

M. Horiuchi, F. Katagiri, J. Yoshiike, S. Suganuma, Y. Tokutake, H. Kronemayerb, W. Bessler, Electrochemical Power Generation Directly from Combustion Flame of Gases, Liquids and Solids, Journal of Electrochemical Society, 2004, pp. A1402-A1405, vol. 151.

M. Horiuchi, F. Katagiri, J. Yoshiike, S. Suganuma, Y. Tokutake, H. Kroneymayerb, W. Bessler, Performance of a Solid-Oxide Fuel Cell Couple Operated via in Situ Catalytic Partial Oxidation of n-Butane, Journal of Power Sources, 2009, pp. 950-957, vol. 189, Elsevier Science Publishers B.V.

M. Toledo, E. Vergara, A. Saveliev, Syngas Production in Hybrid Filtration Combustion, International Journal of Hydrogen Energy, 2011, pp. 3907-3912, vol. 36, Elsevier Science Publishers B.V.

H. Kronemayer, D. Barzan, M. Horiuchi, S. Suganuma, Y. Tokutake, C. Schulz, W. Bessler, A Direct-Flame Solid Oxide Fuel Cell (DFFC) Operated on Methane, Propane, and Butane, Journal of Power Sources, 2007, pp. 120-126, vol. 166, Elsevier Science Publishers B.V.

K. Wang, R. Ran, Y. Hao, Z. Shao, W. Jin, N. Xu, A High-Performance No-Chamber Fuel Cell Operated on Ethanol Flame, Journal of Power Sources, 2008, pp. 33-39, vol. 177, Elsevier Science Publishers B.V.

K. Wang, P. Zeng, J. Ahn, High Performance Direct Flame Fuel Cell Using a Propane Flame, Proceedings of the Combustion Institute, 2011, pp. 3431-3437, vol. 33, Elsevier Science Publishers B.V.

B. Huang, X.J. Zhu, W.Q. Hu, Q.C. Yu, H.Y Tu, Characteristics and Performance of Lanthanum Gallate Electrolyte-Supported SOFC Under Ethanol Steam and Hydrogen, Journal of Power Sources, 2009, pp. 29-36, vol. 186, Elsevier Science Publishers B.V.

S.Han, J. Park, S. Song, K.M. Chun, Experimental and Numerical Study of Detailed Reaction Mechanism Optimization for Syngas (H2 + CO) Production by Non-Catalytic Partial Oxidation of Methane in a Flow Reactor, International Journal of Hydrogen Energy, 2010, pp. 8762-8771, vol. 35, Elsevier Science Publishers B.V.

M. Drayton, A. Saveliev, L. Kennedy, A. Fridman, Y.E. Li, Syngas Production Using Superadiabatic Combustion of Ultra-Rich Methane-Air Mixtures, Twenty-Seventh Symposium (International) on Combustion/The Combustion Institute, 1998, pp. 1361-1367.

C. Xia, M. Liu, Low Temperature SOFCs Based on Gd0.1Ce0.9O1.95 Fabricated by Dry Pressing, Solid State Ionics, 2001, pp. 249-255, vol. 144, Elsevier Science Publishers B.V.

K. Wang, R. Ran, Z. Shao, Methane-Fueled IT-SOFCs with Facile in Situ Inorganic Templating Synthesized Mesoporous Sm0.2Ce0.8O1.9 as Catalytic Layer, Journal of Power Sources, 2007, pp. 251-258, vol. 170, Elsevier Science Publishers B.V.

B. Huang, X.F. Ye, S.R. Wang, H.W. Nie, J. Shi, Q. Hu, J.Q. Qian, X.F. Sun, T.L. Wen, Performance of Ni/ScSZ Cermet Anode Modified by Coating with Gd0.2Ce0.8O2 for an SOFC Running on Methane Fuel, Journal of Power Sources, 2006, pp. 1172-1181, vol. 162, Elsevier Science Publishers B.V.

B.C.H. Steele, Appraisal of Cel-yGdyO2-y/2 Electrolytes for IT-SOFC Operation at 500 Degrees Celsius, Solid State Ionics, 2000, pp. 95-110, vol. 129, Elsevier Science Publishers B.V.

K. Wang, R. Ran, W. Zhou, H. Gu, Z. Shao, J. Ahn, Properties and Performance of Ba0.5Sr0.5Co0.8Fe0.2O3-8 + Sm0.2Ce0.8O1.9 Composite Cathode, Journal of Power Sources, 2008, pp. 60-68, vol. 179, Elsevier Science Publishers B.V.

G. Meng, C. Jiang, J. Ma, Q. Ma, X. Liu, Comparative Study on the Performance of a SDC-Based SOFC Fueled by Ammonia and Hydrogen, Journal of Power Sources, 2007, pp. 189-193, vol. 173, Elsevier Science Publishers B.V.

X. Zhang, M. Robertson, C. Deces-Petit, W. Qu, O. Kesler, R. Maric, D. Ghosh, Internal Shorting and Fuel Loss of a Low Temperature Solid Oxide Fuel Cell with SDC Electrolyte, Journal of Power Sources, 2007, pp. 668-677, vol. 164, Elsevier Science Publishers B.V.

* cited by examiner

Figure 1: Schematic illustration of a portable FFC power generation system

Figure 3: Schematic of experimental setup

Figure 4: Polarization and power density curves of AS-SOFC at the methane flow rate of 400 mL.min$^{-1}$ with the equivalent ratio of 6

Figure 5: Fuel cell temperatures as functions of equivalent ratios and methane flow rates.

Figure 6: Peak power densities of FFC as functions of equivalent ratios and methane flow rates Figure 7: Peak current densities of FFC as functions of equivalent ratios and methane flow rates Figure 8: Polarization and power density curves of FFC with methane flow rates of 320 mL.min$^{-1}$ and the equivalent ratios of (A) 6 and (B) 2

Figure 9: Electrical efficiency of FFC based on the results in Fig. 6

Figure 10: Long term test of FFC with a current density loading of 200 $mA.cm^{-2}$ 11a - Without catalyst layer 11b - with catalyst layer Figure 11: SEM image of anode after test Figure 12: schematic illustration of the preparation of a multilayer electrolyte AS-SOFC based FFC

*The process chart for unit cell fabrication.*

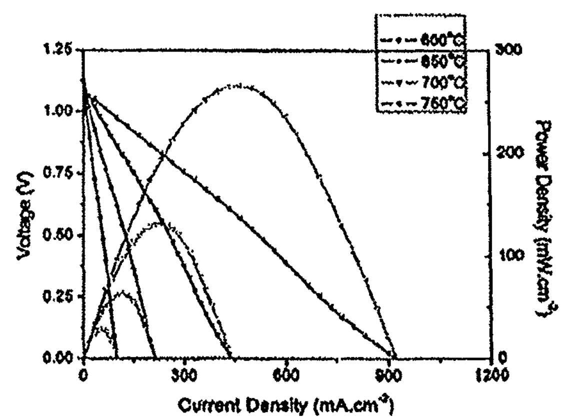
Fig. 15 The performance of fuel cell without SDC layer

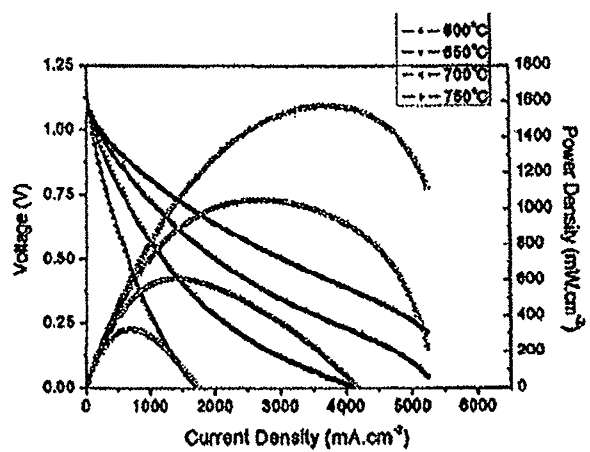
Fig. 16 The performance of fuel cell with SDC layer

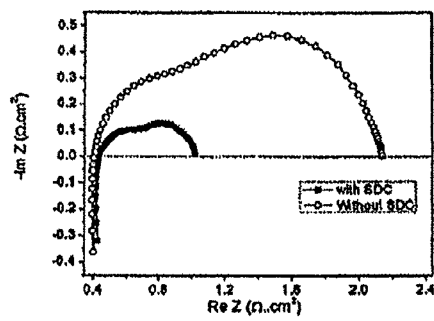
Fig. 17 Electrochemical impedance spectra of fuel cells with and without SDC at 700 °C

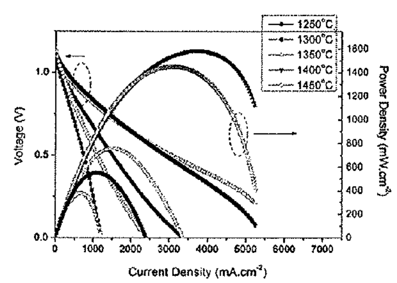
Fig. 18 the performances of fuel cells with SDC layer at 750°C which were sintered at different temperatures from 1250 °C to 1450 °C.

HIGH PERFORMANCE FLAME FUEL CELL USING AN ANODE SUPPORTED SOLID-OXIDE FUEL CELL

CROSS REFERENCE TO RELATED APPLICATIONS

The present application claims priority to U.S. Provisional Application No. 61/502,386, filed on Jun. 29, 2011; which is hereby incorporated by reference herein in its entirety.

BACKGROUND OF THE INVENTION

1. Field of the Invention

The present invention relates to an anode supported solid-oxide fuel cell based flame fuel cell and, more particularly, to an anode supported solid-oxide fuel cell based flame fuel cell that uses hydrocarbon/air mixture as a fuel source and includes an anode layer, a cathode layer, an electrolyte layer, catalyst layer that can act as a protective layer for the anode layer, wherein the catalyst layer includes Ru, Pt, or other possible catalysts, and an interlayer between the cathode layer and the electrolyte layer, wherein the interlayer can include SDC (Samarium-doped ceria), GDC (Gadolinium-Doped Ceria), or other possible electrolyte materials, such as ScSZ ($Sc_2O_3$ stabilized $ZrO_2$), BZY (Yttrium-doped barium zirconate), LSGM ($La_{0.9}Sr_{0.1}Ga_{0.8}Mg_{0.2}O_{3-\delta}$), SNDC ($Sm_{0.075}Nd_{0.075}Ce_{0.85}O_{2-\delta}$), YSZ ($Y_2O_3$ stabilized $ZrO_2$), among others.

2. Description of the Related Art

Solid-oxide fuel cells (SOFCs) are all-solid electrochemical devices that directly convert the chemical energy stored in fuel to electricity. Due to a couple of advantages such as high fuel flexibility and non-noble electrodes, SOFCs have received considerable attention.

Up to now, three concepts of SOFCs have been proposed: dual chamber SOFCs (DC-SOFCs), single chamber SOFCs (SC-SOFCs) and no chamber SOFCs (flame fuel cell, FFC), as should be understood and appreciated by those skilled in the art. Compared to DC-SOFCs and SC-SOFCs, FFC is a fairly new concept which was proposed by Horiuchi et al. in 2004. The operation principles of FFC are based on the combination of a flame with an SOFC in a simple "no-chamber" setup (see FIG. 2). The flame serves as a fuel-flexible partial oxidation reformer, while simultaneously providing the heat required for SOFC operation. Taking methane as an example, the burning methane can generate some useful fuels such as $H_2$ and CO, which are the ideal fuels for SOFC. The combustion of methane can generate large amounts of heat to maintain the fuel cell temperature.

FFC shows several distinct advantages including: (1) High fuel flexibility—Gaseous fuels (methane), liquid fuels (jet fuel) and solid fuels (coal) can be applied directly without any pretreated step, which is also beneficial for fuel delivery and storage. Any combustibles can be used directly for FFC operation; (2) Simple setup—No additional heat device is required for initiating the fuel cell. Flame heat release can rapidly achieve the fuel cell operation temperature. The no-chamber design allows the fuel and oxidant to be easily separated; and (3) Rapid start-up—As with the SC-SOFC, the direct-flame fuel cell is capable of rapid start-up and ideal for portable applications. These advantages come with the cost of lower fuel efficiency due to direct chemical oxidation and incomplete fuel utilization. For portable or military applications, for example, rapid start-up and high energy density are more important than the efficiency of fuel utilization. Even with the disadvantage of being a low efficiency method, FFC is considered a viable alternative for creating a power source.

Two types of SOFCs have been employed for FFC: the electrolyte supported SOFC (ES-SOFC), and the anode supported SOFC (AS-SOFC), as should be understood and appreciated by those skilled in the art. ES-SOFC uses a thick electrolyte layer which sustains most of mechanical strength for the entire fuel cell. Fabrication is easy as cathode and anode layers can be directly sprayed on the thick electrolyte layer. Problems for the ES-SOFC based FFC include poor power density and thermal cracking. To address these issues, the AS-SOFCs based FFC were developed.

The AS-SOFC has a thick and porous anode and a thin electrolyte layer which can minimize the ohmic resistance and increase thermal shock resistance of FFC. A previous study has shown that the AS-SOFC based FFC achieved much higher power density and higher thermal shock resistance than those of ES-SOFC based FFC.

The methane/air mixture has been widely used as the flame source for the FFC since it exhibits less coking compared to other heavy fuels. Compared to a pure methane flame, the methane/air flame can perform at higher temperatures and higher concentrations of syngas, which benefits the fuel cell performance. The methane/air based FFC's reported use an ES-SOFC configuration with low power density. In this setup the performance of the FFC was dominated by temperature due to its higher ohmic resistance. For further information, see "*High Performance Direct Flame Fuel Cell Using a Propane Flame,*" Proceedings of the Combustion Institute, Vol. 33(2):3431-3437 (2011), the entire contents of which are hereby incorporated by reference.

Description of the Related Art Section Disclaimer: To the extent that specific publications are discussed above in this Description of the Related Art Section, these discussions should not be taken as an admission that the discussed publications are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section (as well as throughout the application), they are all hereby incorporated by reference into this document in their respective entirety(ies).

SUMMARY OF THE INVENTION

It is a principal object and advantage of the present invention to provide a high performance hydrocarbon/air-flame fuel cell using an anode supported solid-oxide fuel cell. The hydrocarbon fuel can include, for example, gaseous, liquid, and/or solid fuels, and biofuels.

It is another object and advantage of the present invention to provide an AS-SOFC based FFC that is simple and compact, and will yield a high power density device. The AS-SOFC based FFC can include an anode layer, a cathode layer, an electrolyte layer, catalyst layer that can act as a protective layer for the anode layer, wherein the catalyst layer includes Ru, Pt, or other possible catalysts, and an interlayer between the cathode layer and the electrolyte layer, wherein the interlayer includes SDC (Samarium-doped ceria), GDC (Gadolinium-Doped Ceria), or other possible electrolyte materials, such as ScSZ ($Sc_2O_3$ stabilized $ZrO_2$), BZY (Yttrium-doped barium zirconate), LSGM ($La_{0.9}Sr_{0.1}Ga_{0.8}Mg_{0.2}O_{3-\delta}$), SNDC ($Sm_{0.075}Nd_{0.075}Ce_{0.85}O_{2-\delta}$), YSZ ($Y_2O_3$ stabilized $ZrO_2$).

BRIEF DESCRIPTION OF THE DRAWINGS

The present invention will be more fully understood and appreciated by reading the following Detailed Description in conjunction with the accompanying drawings, in which:

FIG. 15 is a graphical illustration of the performance of a fuel cell without SDC layer, according to an embodiment of the present invention.

FIG. 16 is a graphical illustration showing the performance of a fuel cell with SDC layer (~3 μm), according to an embodiment of the present invention.

FIG. 17 is a graphical illustration showing the electrochemical impedance spectra of fuel cells with and without SDC at 700° C., according to an embodiment of the present invention FIG. 18 is a graphical illustration that shows the performances of fuel cells with SDC layer at 750° C. which were sintered at different temperatures from 1250° C. to 1450° C., according to an embodiment of the present invention.

DETAILED DESCRIPTION

Figure 1:
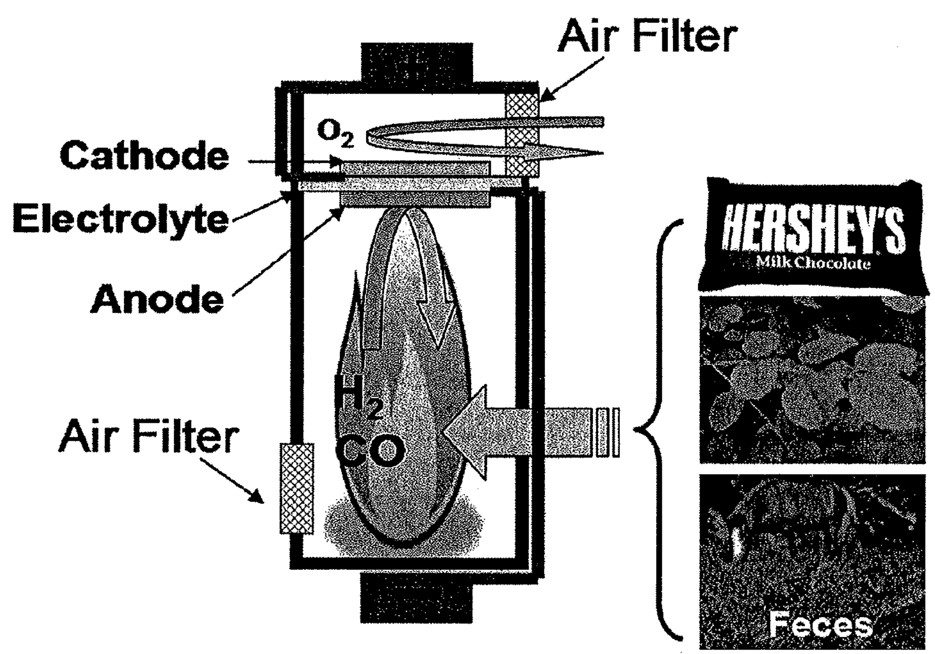
FIG. 1 is a schematic illustration of a portable FFC power generation system, according to an embodiment of the present invention.
Figure 2:
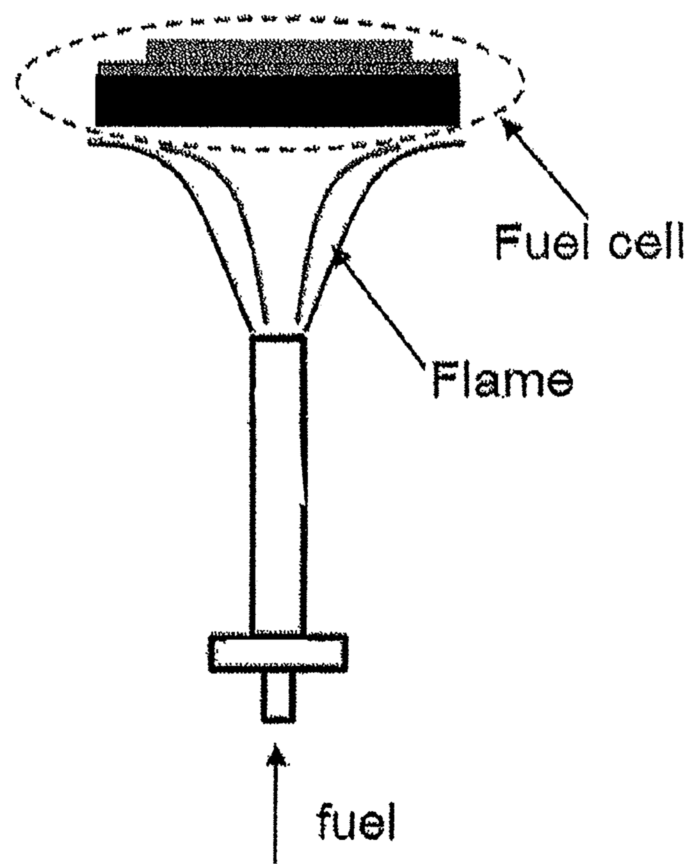
FIG. 2 is a schematic illustration of a flame fuel cell.

The present invention will be more fully understood and appreciated by reading the following Detailed Description in conjunction with the accompanying drawings, wherein like reference numerals refer to like components.

It is noted that the influence of fuel concentration and its interaction with temperature on the fuel cell performance is difficult to investigate.

As shown and described herein, in accordance with an embodiment of the present invention, an anode supported Solid-oxide Fuel Cell (SOFC) based flame fuel cell (FFC) was investigated by using a methane/air flame. The FFC showed a high power density of 791 $mW \cdot cm^{-2}$, which is comparable to that of a dual chamber SOFC or a single chamber SOFC. The influence of fuel cell temperature and fuel concentration was investigated in detail by varying the methane flow rates and equivalent ratios. It was found that the temperature correlated to the power output at high equivalent ratios, and the fuel concentration correlated to the power output at low equivalent ratios. The mixing conductivity of electrolyte is an important factor for the power output at high operation temperature. The FFC demonstrated stability during a long term test. Although the efficiency was found to be low in the current test, FFC is still considered an alternative method for power source due to its high power density and simple configuration.

As discussed below in the Examples section, experimental results have been presented on the operation of AS-SOFC-based FFC with methane/air as the flame source, and a more extensive examination of the electrochemical behavior of fuel cells at the different operating conditions have been completed. In addition, the long term testing and efficiency calculations have been performed. All references to fuel cell, AS-SOFC, flame fuel cell, mean the AS-SOFC based FFC, unless otherwise noted.

The successful demonstration of the proposed FFC power generation system will feature numerous advantages compared to alternative power generation methods. The proposed AS-SOFC design is simple and compact and will yield a high power density device. It will feature rapid start-up and shutdown times. The newly designed AS-SOFC will also have high coking resistance and hallmark characteristic of fuel flexibility. While the proposed design is applicable to a variety of commercial and military applications as a fuel-flexible compact power generator, a broader impact of the proposed project is the development of a well-characterized AS-SOFC unit that can be used with other reacting flow environments. For example, it can be easily integrated into three-way converters or exhaust ducts of furnaces, automobiles, or even airplanes to remove partially combusted gas from the exhaust stream. Thus AS-SOFCs can improve thermal efficiencies, lower emissions and provide a more energy secure future.

Furthermore, the FFC design of an embodiment of the present invention can be scaled for personal power for soldiers or campers, for example. AS-SOFCs are a competitive alternative to batteries, which are heavy and have finite capacity. When soldiers or campers need electrical energy to operate portable devices, they can simply feed any combustible materials around them into FFC power generation system (see FIG. 1). Soldiers in the field only need a cigarette-lighter and any combustible materials to generate electricity on a mission.

In summary, the FFC can include an anode layer, a cathode layer, an electrolyte layer, catalyst layer that can act as a protective layer for the anode layer, wherein the catalyst layer can include Ru or Pt as well as a variety of other possible catalysts, and an interlayer between the cathode layer and the electrolyte layer, wherein the interlayer can include but is not limited to SDC (Samarium-doped ceria), GDC (Gadolinium-Doped Ceria), or other possible electrolyte materials, such as ScSZ ($Sc_2O_3$ stabilized $ZrO_2$), BZY (Yttrium-doped barium zirconate), LSGM ($La_{0.9}Sr_{0.1}Ga_{0.8}Mg_{0.2}O_{3-\delta}$), SNDC ($Sm_{0.075}Nd_{0.075}Ce_{0.85}O_{2-\delta}$), YSZ ($Y_2O_3$ stabilized $ZrO_2$), among others. The cathode later can comprise BSCF ($Ba_{0.5}Sr_{0.5}Co_{0.8}Fe_{0.2}O_{3-\delta}$), LSM (Sr-doped $LaMnO_3$, $La_{0.8}Sr_{0.2}MnO_3$), LSF ($La_{0.6}Sr_{0.4}FeO_3$), SSC ($Sm_{0.2}Sr_{0.8}CoO_{3-\delta}$), BLC ($Ba_{0.5}La_{0.5}CoO_{3-\delta}$), LSC ($La_{0.6}Sr_{0.4}CoO_{3-\delta}$), LSCF ($La_{0.6}Sr_{0.4}Co_{0.2}Fe_{0.8}O_{3-\delta}$), LSCM ($Ln_{0.6}Sr_{0.4}Co_{0.8}Mn_{0.2}O_{3-\delta}$), LNF ($LaNi_{0.6}Fe_{0.4}O_{3-\delta}$), or LNC ($La_2Ni_{0.6}Cu_{0.4}O_{4-\delta}$), among many others.

Advantages of the invention are illustrated by the following Examples. However, the particular materials and amounts thereof recited in these examples, as well as other conditions and details, are to be interpreted to apply broadly in the art and should not be construed to unduly restrict or limit the invention in any way.

EXAMPLES

Example 1

Fuel Cell Fabrication

This Example describes the preparation of an AS-SOFC-based FFC using a co-pressing technique. See C. R. Xia, M. L. Liu, Solid State Ionics 144 (2001) 249-255. SDC ($Sm_{0.2}Ce_{0.8}O_{1.9}$, NexTech materials), NiO+SDC (60:40 w/w, NexTech materials) and BSCF ($Ba_{0.5}Sr_{0.5}Co_{0.8}Fe_{0.2}O_{3-\delta}$, see details of the synthesis of BSCF in K. Wang, R. Ran, Z. P. Shao, J. Power Sources 170 (2007) 251-258)+SDC (70:30 w/w) were used as the electrolyte, anode and cathode materials, respectively.

In brief, the NiO+SDC powders were first pressed as substrates; SDC powders were then added onto the substrates and pressed again to form bi-layer pellets, which were fired in air at 1350° C. for 5 h for densification of the electrolyte layer (~20 μm). Then the bi-layer pellets (~1.25 cm$^2$) with 0.4 mm thickness were placed in hydrogen at 600° C. for 3 h to convert NiO to Ni. The BSCF+SDC was then spray deposited onto the electrolyte surfaces of the sintered bi-layer pellets by using a spraying gun, and then fired at 1000° C. in nitrogen for 5 h to form the complete cells with a cathode layer (area: ~0.6 cm$^2$).

Example 2

Characterization

This Example describes the investigation of the electrochemical behaviors of the flame fuel cell using the IV (current-voltage) method. The IV (current-voltage) method uses a 4-probe technique, to eliminate the effect of the wire resistances. Behaviors that were examined using the Keithley 2420 source meter that was interfaced with a computer for data acquisition were: polarization plots, power density curves and current density. A K-type thermocouple was attached to the center of the cathode surface and the edge of the fuel cell, and was used to measure the instant temperature of the flame fuel cell.

Example 3

Test Setup

Figure 3:
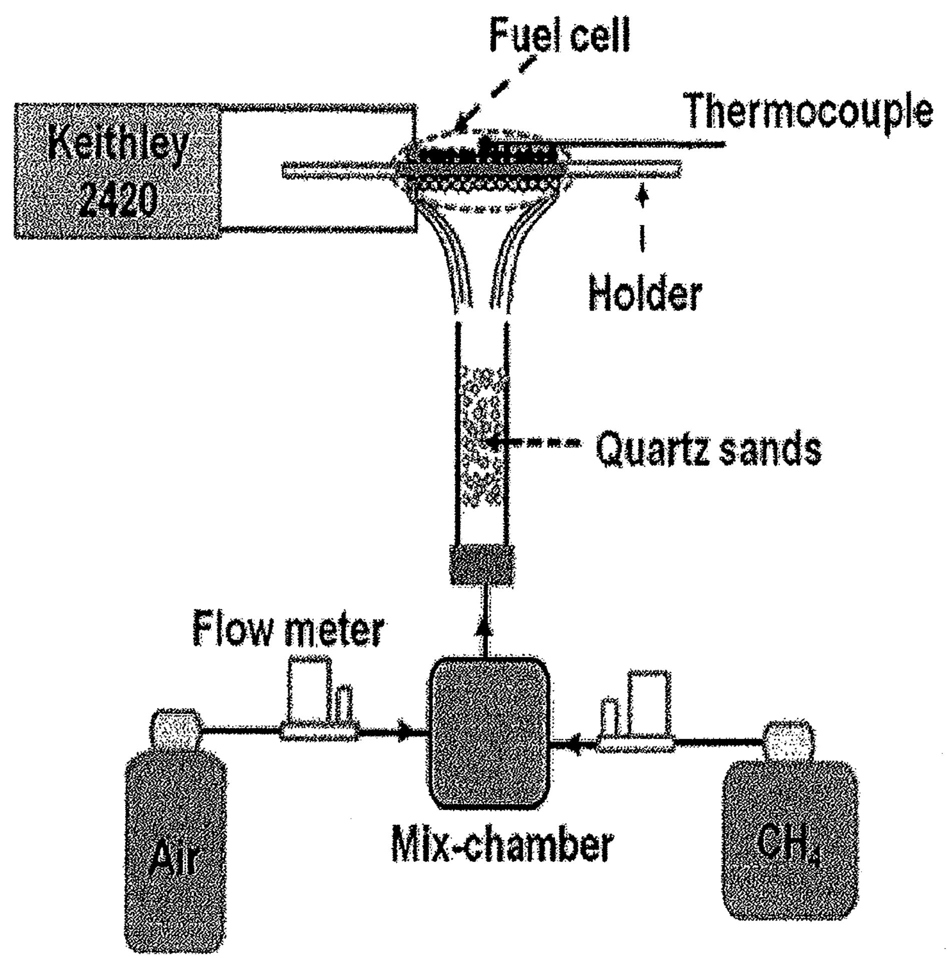
FIG. 3 is a schematic of the FFC testing system, according to an embodiment of the present invention.

This Example describes the fuel cell testing system. FIG. 3 shows a schematic of the FFC testing system. In brief, the fuel cell fabricated in Example 1 was glued on a metal disk (~30 mm) using the silver paste, which was used to avoid the diffusion of anode gas into the cathode. Silver wire, paste and net were applied as current collectors for the fuel cells. A quartz tube (ID: 4 mm) was used as a burner, which was placed under the fuel cell with a distance of 1 cm. A quartz tube was filled with quartz sands to achieve better mixing and avoid flashback. Two mass flow controllers were used to regulate the flow rate of fuel and air through the burner in response to varying equivalence ratios Θ, $$\Phi = \frac{n_{fuel}/n_{air}}{n^s_{fuel}/n^s_{air}} \quad (1)$$

where n is the molar flow rate and $n^s$ are the flow rates needed for stoichiometric reaction. LabView data acquisition software was used to control the mass flow controllers and to record the response of thermocouples.

Results of Testing and Findings

The following Examples describe the results of the testing and characterization of the fuel cell that is described in the previous Examples.

Example 4

This Example describes the evaluation of the thermal shock behavior of the fuel cell.

Before the fuel cell test, the thermal shock behavior of the fuel cell was evaluated by placing the fuel cell directly onto the methane flame. The fuel cell temperature was rapidly raised from room temperature to ~680° C. in 10 seconds. The results show that no cracking was found at this high heating rate which indicates the AS-SOFC has very high thermal shock resistance. The initial test of the flame fuel cell was conducted at an equivalent ratio of 6 with the methane flow rate of 400 mL·min$^{-1}$.

Figure 4:
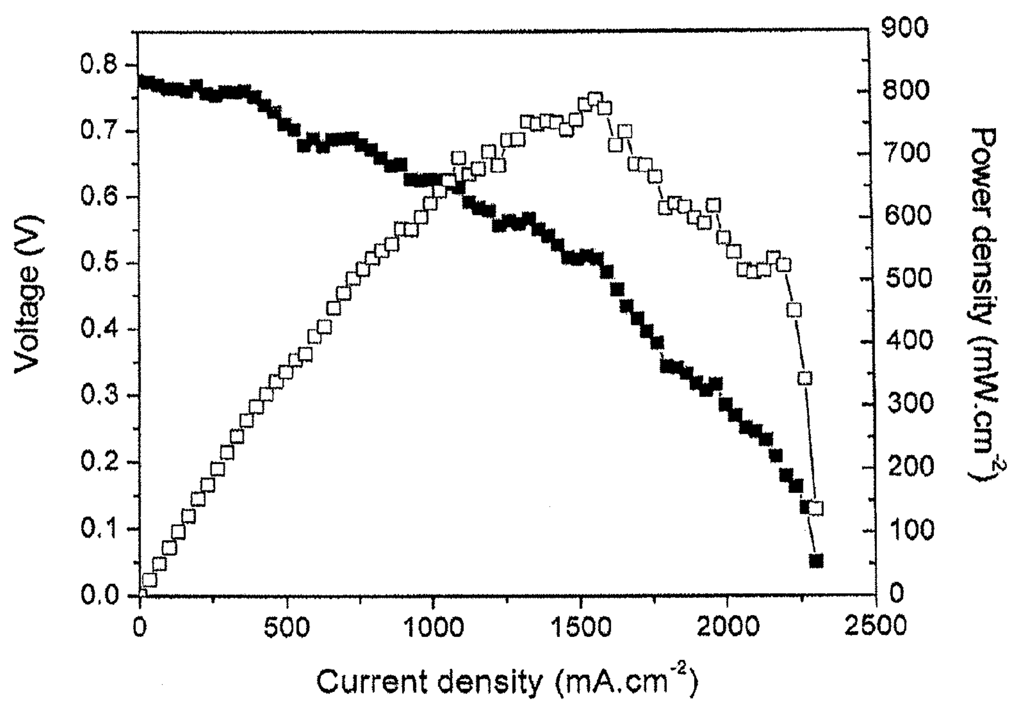
FIG. 4 is a graphical illustration of the polarization and power density curves of AS-SOFC at the methane flow rate of 400 $mL \cdot min^{-1}$ with the equivalent ratio of 6, according to an embodiment of the present invention.

As shown in FIG. 4, the fuel cell achieved a power density of ~791 mW·cm$^{-2}$ and a maximum current density of ~2300 mA·cm$^{-2}$. It was noted that the power density and current density are the highest reported to date in the literature for a flame fuel cell and are comparable to the performances of direct methane fueled DC-SOFC (Bo Huang, X. F. Ye, S. R. Wang, H. W. Nie, J. Shi, Q. Hu, J. Q. Qian, X. F. Sun, T. L. Wen, J. Power Sources 162 (2006) 1172-1181) and SC-SOFC (Z. P. Shao, J. Mederos, W. C. Chueh, S. M. Haile, J. Power Sources 162 (2006) 589-596), and without any optimization. The thin electrolyte layer, rich fuel atmosphere in the anode and the relevant fuel cell temperature (~650° C.) all contributed to the high power output. As previously discussed, the thin electrolyte and high temperature reduces the ohmic loss, at the same time, the fuel rich condition can supply enough fuels to decrease the concentration polarization especially at the high current loading. The total polarization loss was significantly reduced, increasing the fuel cell performance. The FFC was operated open to the atmosphere; any small disturbance in the flame will affect the fuel cell temperature and gas compositions and further impact the variation of power output.

In FIG. 4 the I-V plot was not smooth, especially at the high current loading. This was caused by small atmospheric disturbances of the FFC flame. Larger variations were also found in the power density curves especially in the high current density load. Most fuel cells are designed to operate at a low current density, which is an efficient way to avoid the internal loss. The effect of such a variation in the FFC can be neglected since the variation at low current density is very small.

Example 5

This Example describes the testing of the AS-SOFC based FFC at various conditions to investigate the influence of the interaction between the temperature and fuel on the fuel cell performance. Too strong a reaction or too high fuel flow rates will cause safety issues.

The equivalent ratio was refined from 2 to 10 (for some points, the equivalent ratios were from 2.5 to 10 due to too high temperature for fuel cell) and the methane flow rates were limited from 0 to 400 mL·min$^{-1}$. SDC based fuel cells are operated at intermediate temperatures, from 400 to 700° C. (B. C. H. Steele, Solid State Ionics 129 (2000) 95-110). The fuel cell temperatures were measured to verify the feasibility of operation. In the current setup, it was observed that the fuel cell temperature was below 400° C. when the methane flow rate was less than 80 mL·min$^{-1}$. Only results for the methane flow rates from 80 to 400 mL·min$^{-1}$ are shown.

Figure 5:
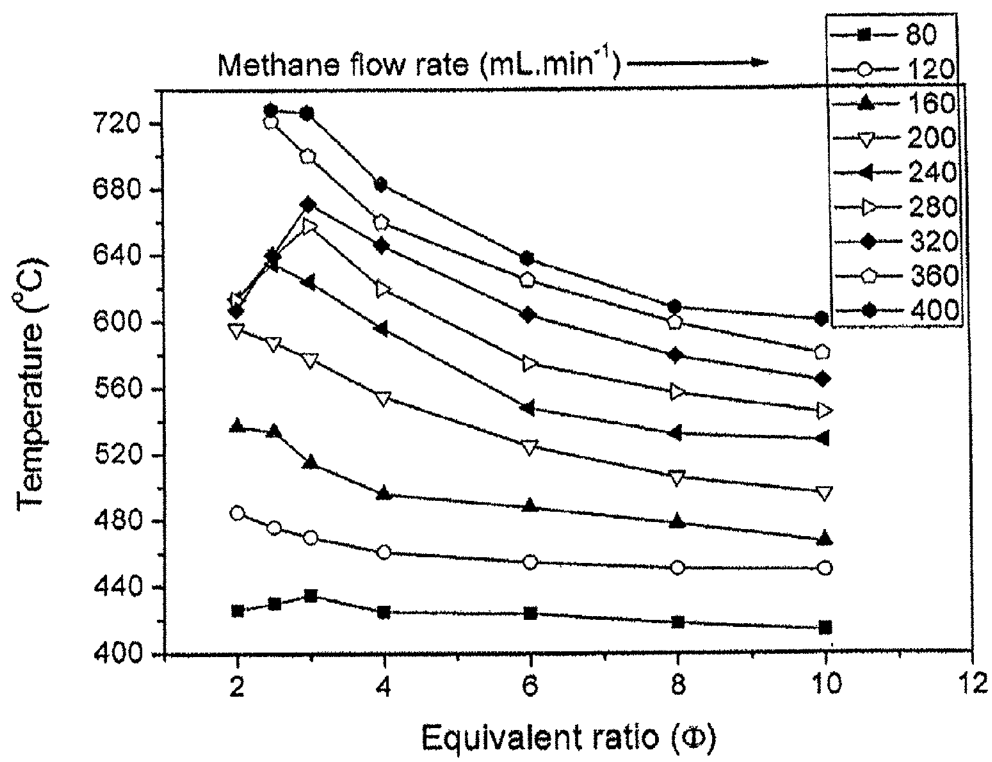
FIG. 5 shows a graphical illustration of fuel cell temperatures as functions of equivalent ratios and methane flow rates, according to an embodiment of the present invention.

FIG. 5 shows the temperatures of the fuel cell with the methane flow rates ranged from 80~400 mL·min$^{-1}$ at different equivalent ratios. The increase of fuel flow rates results in the increase of the temperature for a certain equivalent ratio due to the increase of heat release. The temperature increases by reducing the equivalent ratio until the stoichiometric point is reached in a certain fuel flow rate. The trend of the fuel cell temperature in FIG. 5 can satisfy such mechanisms in a specific equivalent ratio or fuel flow rate for most cases. However, the temperature of the flame fuel cell is affected by the flame shape. For example, the temperature of fuel cell which was supposed to increase suddenly decreased at the equivalent ratio of 2.5 with a methane flow rate of 320 mL·min$^{-1}$. This phenomenon is attributed to the variation of the flame shape which changes the temperature distribution on the fuel cell. The temperature profile indicates that the flame fuel cell is suitable for operating at these conditions.

Example 6

Figure 6:
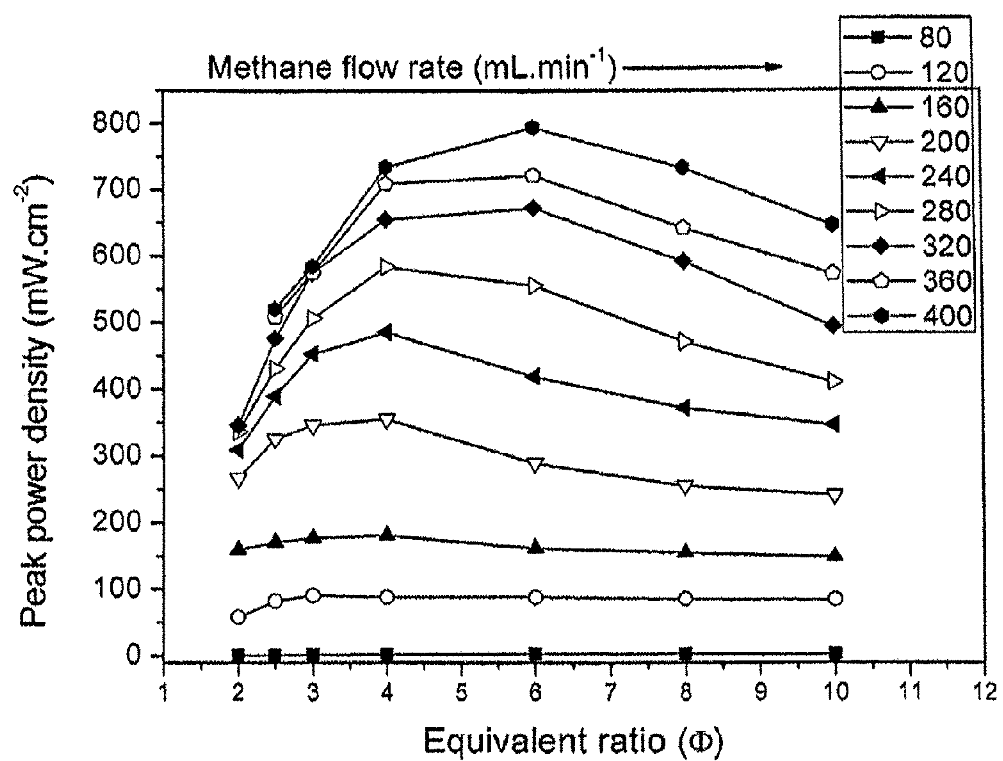
FIG. 6 shows a graphical illustration of peak power densities of FFC as functions of equivalent ratios and methane flow rates, according to an embodiment of the present invention.

This Example describes fuel cell testing based on the temperature results from FIG. 5, discussed in the previous example. FIG. 6 displays peak power densities of fuel cells with methane flow rates ranging from 80-400 mL·min$^{-1}$ at different equivalent ratios.

For high equivalent ratios (e.g. at 6), the power densities improved with the increase of methane flow rate. There are two reasons for the increase of power output: the temperature increased by increasing the methane flow rates and reduced the resistance of the fuel cell; the increase of methane flow rates supplied sufficient fuel for high power output. For low equivalent ratios with high flow rates, the power did not increase even though the temperature increased. For example, in contrast to the temperature increasing (about 50° C.) from the methane flow rates of 320 to 400 mL·min$^{-1}$ at equivalent ratio of 3, the difference of power densities was only ~30 mW·cm$^{-2}$ which is typically more than 100 mW·cm$^{-2}$ for SDC based AS-SOFC (K. Wang, R. Ran, W. Zhou, H. X. Gu, Z. P. Shao, J. Ahn, J. Power Sources 179 (2008) 60-68; G. Y. Meng, C. R. Jiang, J. J. Ma, Q. L. Ma, X. Q. Liu, J. Power Sources 173 (2007) 189-193).

Under these high temperature conditions, factors such as insufficient electrochemical activity of the electrode, or lack of fuel, are not the key limitations to the fuel cell power output. The electronic conductivity of electrolyte is responsible for the power drop. The SDC exhibits a mixed (electronic and ionic) conducting characteristic when the fuel cell temperature reaches 650° C. or higher (X. G. Zhang, M. Robertson, C.De^ces-Petit, W. Qu, O. Kesler, R. Maric, D. Ghosh, J. Power Sources 164 (2007) 668-677). Consequently an internal short circuit was introduced by the electronic conductivity, which lowers the power output.

By varying the equivalent ratio while fixing the methane flow rate, the fuel cell performance shows a more complex behavior. For the methane flow rate of 80 mL·min$^{-1}$, due to the low temperature (mostly near 420° C.), the power density is poor. In addition to the resistance from the electrolyte at such a low temperature, insufficient electrochemical activity of electrodes is also responsible for the poor power density. For flow rates higher than 80 mL·min$^{-1}$, the peak power densities show convex curves. The power increased at first and reached the maximum, then decreased. For example, with the methane flow rate of 240 mL·min$^{-1}$, the fuel cell achieved a peak power density of 345 mW·cm$^{-2}$ initially, then reached the maximum at 485 mW·cm$^{-2}$ and decreased to 309 mW·cm$^{-2}$. Combined with FIG. 7, it indicates that the concentration polarization played a key effect on fuel cell performance drop. Natural convection was used for the oxygen supply at the cathode. If the oxygen supply is limited, this condition could introduce concentration polarization.

By excluding this possibility, the fuel cell was tested using a dual chamber configuration where the cathode was exposed to the atmosphere (see details about the DC-SOFC in K. Wang, R. Ran, Z. P. Shao, J. Power Sources 170 (2007) 251-258). In this way, the oxygen was supplied only by natural convection. The results show that the maximum current density is 4 A·cm$^{-2}$. The maximum current density was 2.3 A·cm$^{-2}$ in the current test, which indicates oxygen at the cathode was sufficient. Oxygen will not dominate the fuel cell performance and bring high concentration polarization to the fuel cell. The limited fuel supply for the fuel cell is responsible for the fuel cell performance drop. Fuel cell performance, before reaching maximum power density, was dominated by temperature, because the maximum current densities did not exhibit any change. As the temperature increased, fuel concentration continued to dominate the fuel cell performance drop, and maximum current densities decreased. Too much air in the fuel results in less fuel available, which creates the concentration polarization for the fuel cell.

Figure 8:
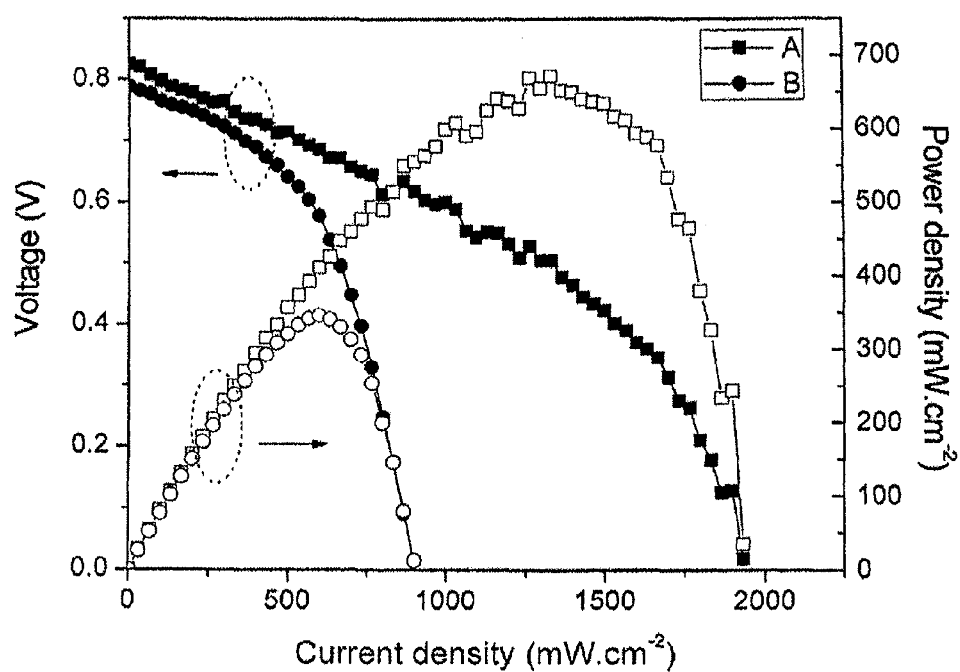
FIG. 8 shows a graphical illustration of polarization and power density curves of FFC with methane flow rates of 320 $mL \cdot min^{-1}$ and the equivalent ratios of (A) 6 and (B) 2, according to an embodiment of the present invention.

A selection of fuel cell test results was presented in FIG. 8. With the same methane flow rate, the current densities decreased from 1933 mA·cm$^{-2}$ to 900 mA·cm$^{-2}$. Power densities were decreased from 672 mW·cm$^{-2}$ to 345 mW·cm$^{-2}$. The I/V curve exhibited a convex-down curvature at the equivalent ratio of 2. Considering that the fuel cell temperatures were similar (~605° C.) and the effect of internal short circuit was neglected at these two conditions, the fuel concentration was found to be responsible for the power density drop. It can be expected that the fuel cell performance will continue to drop due to the concentration polarization with further decrease of equivalent ratio.

Figure 7:
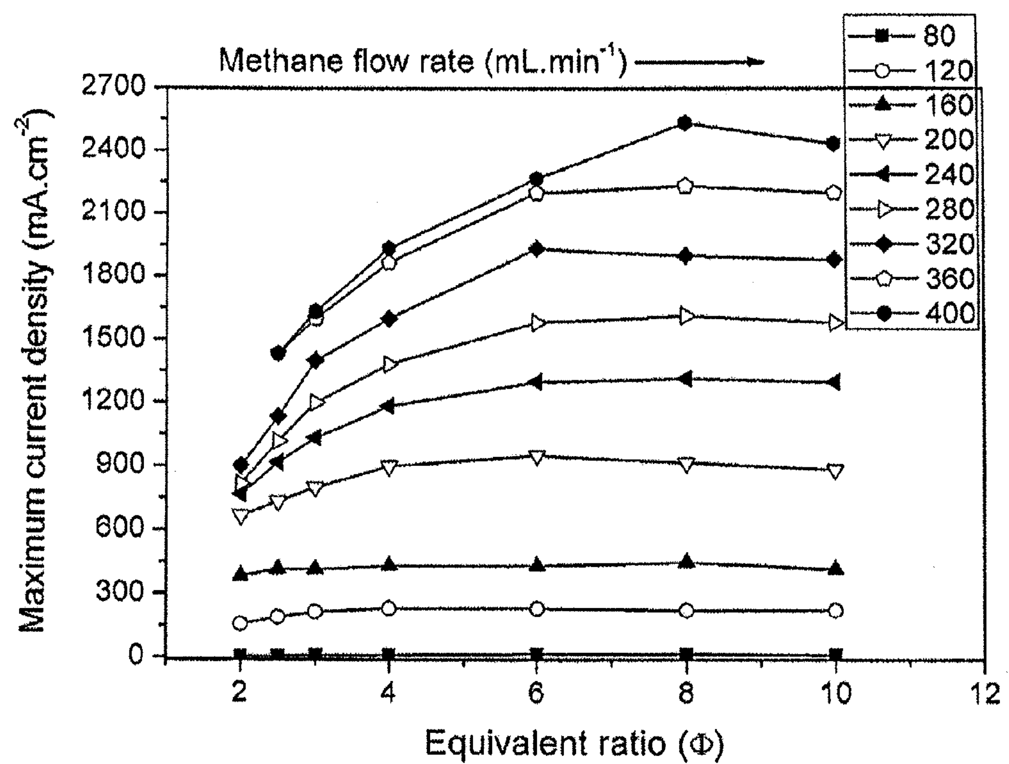
FIG. 7 shows a graphical illustration of peak current densities of FFC as functions of equivalent ratios and methane flow rates, according to an embodiment of the present invention.

Based on results from FIG. 7, the electrical efficiency ($\epsilon$) was calculated (shown in FIG. 9) based on the method of Horiuchi et al., *Performance of a solid oxide fuel cell couple operated via in situ catalytic partial oxidation of n-butane*, Journal of Power Sources, Volume 189, Issue 2, 15 Apr. 2009, Pgs. 950-957. The electrical efficiency is defined as $$\varepsilon = \frac{\text{electrical power generated by } FFC}{\text{heating power of fuel input}} = \frac{P \cdot A \cdot V_m}{\dot{V} \cdot HHV} \quad (2)$$

where P is the peak power density, A is cathode area of fuel cell, $\dot{V}$ in ($m^3 \cdot s^{-1}$) is the methane flow rate at standard conditions, $V_m = 2.24 \times 10^{-2}\ m^3 \cdot mol^{-1}$ is the molar volume at standard conditions, and $HHV = 8.89 \times 10^5\ J \cdot mol^{-1}$ (D. R. Lide, CRC Handbook of Chemistry and Physics, 90 ed., CRC Press, Boca Raton, Fla., USA, 2009).

Figure 9:
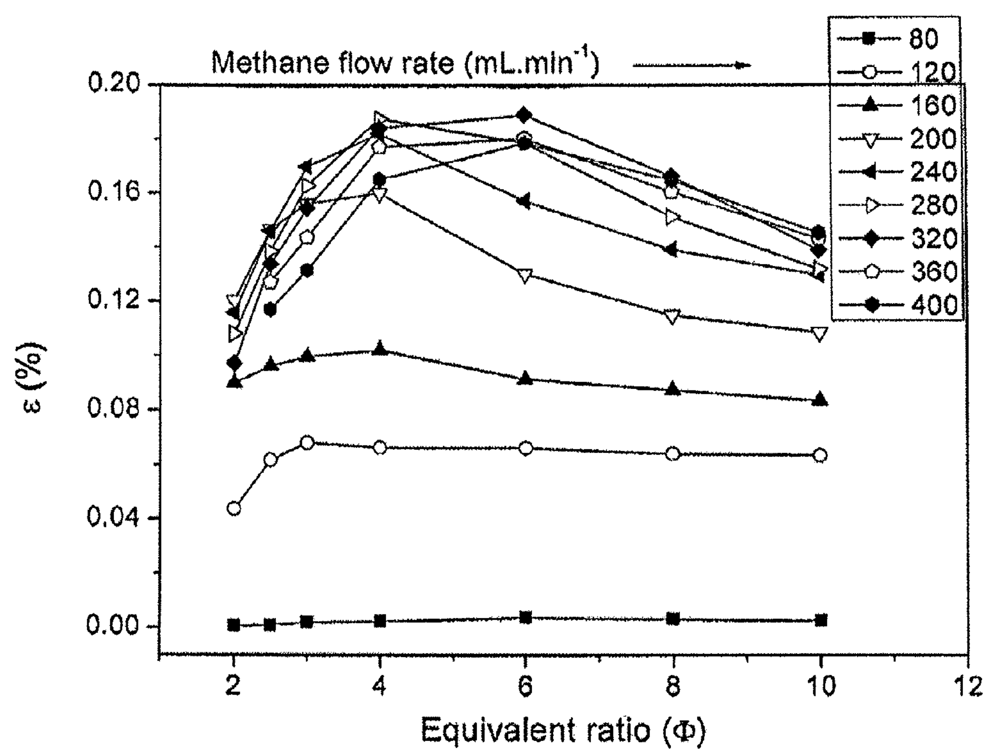
FIG. 9 shows a graphical illustration of electrical efficiency of FFC based on the results in FIG. 6, according to an embodiment of the present invention.

As shown in FIG. 9, in contrast to the condition achieved for the best power out, the best efficiency (~0.19%) was achieved at an equivalent ratio of 6 with the methane flow rate of 320 This value is low. Even with the low efficiency, the simplicity of the FFC and its main application for combined heat and power must be taken in to consideration. It is noted that the flame in the current setup is capable of creating a fuel cell 10 times larger than the current fuel cell. Gains in efficiency are expected from the larger fuel cell.

Example 7

This Example describes the performance of a long term test at a current density loading of 200 $mA \cdot cm^{-2}$. The FFC was operated by a methane/air flame at an equivalent ratio of 6 with a methane flow rate of 320 $mL \cdot min^{-1}$.

Figure 10:
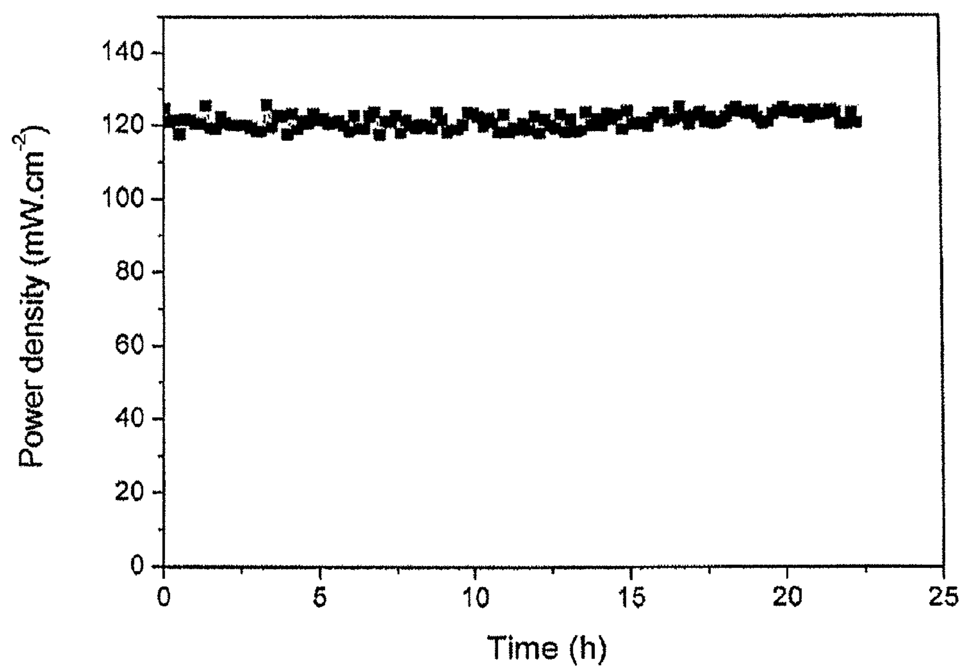
FIG. 10 shows a graphical illustration of a long term test of FFC with a current density loading of 200 $mA \cdot cm^{-2}$, according to an embodiment of the present invention.

As shown in FIG. 10, in response to the atmospheric variation, there was a small oscillation on the power output. There was no performance degradation during the length of the test which illustrates the stability of FFC.

The AS-SOFC based flame fuel cell shows a high performance of 791 $mW \cdot cm^{-2}$ with the methane/air flame. The fuel cell performance shows a complex behavior based on different temperatures, fuel flow rates and equivalent ratios. The flame temperature dominates the power density at the high equivalent ratios. The fuel concentration dominated performance at the low equivalent ratios. For some test conditions with high temperatures, the mixing conductivity of SDC also affected the power output. The long term test shows stability of fuel cell operation. It is difficult to maintain control of all the parameters such as temperature, equivalent ratio and fuel concentration, for fuel cell test, at the same time since the fuel cell and flame were combined together and they are operated in the open environment. For this reason, a meterable burner may be a solution for future work. Even with a low efficiency, FFC of an embodiment of the present invention is still an alternative method for providing a power source due to its high power density and simple configuration.

Example 8

This Example describes the addition of a catalyst layer that can act as a protective layer for the anode of the AS-SOFC based flame fuel cell of an embodiment of the present invention. This catalyst layer can provide high coking resistance caused by a flame.

Nickel-based electrodes have been widely utilized as a choice of anode materials in direct hydrocarbon SOFC. Nickel exhibits a high reforming catalytic activity for various hydrocarbon fuels and a high electrochemical activity for hydrogen oxygenation. In addition, nickel possesses a high electronic conductivity. However, the major disadvantage of the Ni-based anode is the promotion of competitive catalytic cracking of hydrocarbon reactions to form carbon coking (P. Zeng, R. Ran, Z. Chen, W. Zhou, H. Gu, Z. Shao, S. Liu, J. Alloys Comp. (2008) 465, R. Juškėnas, I. Valsiūnas, V. Pakštas, A. Selskis, V. Jasulaitienė, V. Karpavičienė, V. Kapočius, Appl. Surf. Sci. 253 (2006) 1435). Carbon coking blocks the gas diffusion within the anode, which may even rupture the fuel cell.

One way to prevent the coking issue is to use various metal oxides possessing high oxygen ionic mobility. Due to the availability of their lattice oxygen, coking is significantly reduced while recovering high reforming activity for hydrocarbon fuels. On the other hand, a major disadvantage of the metal oxides is their low electronic conductivity (e.g. $CeO_2$ has the electronic conductivity on the order of 10 s/m at room temperature), leading to a high overpotential and low power density. For this reason, Cu-ceria anode has also been employed in favor of its excellent electronic conductivity while being inactive in the formation of C—C bonds. In this design, the ceria enhances the electro-oxidation of hydrocarbon fuels, while Cu serves merely as an electron-conducting additive. The Cu-ceria anode shows a good power output and stability for a simple hydrocarbon fuels up to butane. However, it was not able to activate high C compounds such as toluene ($C_7$) due to its low reforming activity toward the long hydrocarbon fuels. More importantly, Cu is easily oxidized in the atmosphere.

A deposited catalyst layer onto the anode surface performs as a function layer to promote water gas shift and partial oxidation reactions, thereby increasing the syngas concentration for enhanced fuel cell performance. Furthermore, the catalyst improves the fuel decomposition to decrease the possibility of carbon coking.

Therefore, an embodiment of the present invention contemplates the adoption of $CeO_2$—Ru as a catalyst layer on a SDC+Ni (or other) anode material. $CeO_2$—Ru has demonstrated a strong catalytic reactivity on reforming higher hydrocarbon with high coking resistance. It has also been shown that the $CeO_2$—Ru employed in a SC-SOFC system achieved a high power density (>400 $mW/cm^2$) at 550° C. Note that, while it is contemplated that the AS-SOFC based flame fuel cell can be fed primarily by syn-gas to operate consisting of lower hydrocarbon fuels, the adopted catalyst/anode materials are still desirable for their superior overall performance characteristics. As will be discussed in next Example, a meterable porous-medium porous reactor will further ensure an optimal composition of the syn-gas supplied to the anode such that coking is minimized.

In brief, the $CeO_2$—Ru catalyst is commonly prepared by the impregnation method. An appropriate amount of $RuCl_3$ and binder PVB is added to a suspension consisting of $CeO_2$ powders and 10 mL ethanol, followed by grinding for 30 min with an agate mortar and pestle and then well mixed by ultrasonic vibration for one hour. The prepared mixture is then heated to dry, and is subsequently sintered at 600° C. for two hours. Finally, the powders are reduced using $H_2$ for additional two hours at 600° C.

The fuel reforming performance and coking resistance of the catalyst-anode layer can be examined by a scanning electron microscope (SEM) and gas chromatography/mass spectrometry (GC/MS). SEM provides detailed information about the particle agglomeration, catalyst morphology, and the carbon coking behavior.

In general, uniformly dispersed catalyst material improves the reforming ability and reduces the usage of noble metal in the catalyst. One of the issues with Ru-based catalysts is that Ru is prone to agglomerate during the sintering process if it is not dispersed properly, thus reduces the catalytic surface areas and decreases the reforming ability. The SEM directly examines the level of Ru dispersion on $CeO_2$, especially after sintering process, and how dispersion behavior is affected by the preparation process such as ultrasonic vibration time and sintering temperature.

The catalyst morphology can also affect the fuel cell performance significantly. For example, the deposited catalyst layer may block the fuel diffusion into the anode. A higher porosity in the layer promotes gas diffusion, and a lower porosity causes a lower fuel concentration inside the anode. The SEM measurements of the catalyst layer will allow identification of an optimal catalyst layer in terms of key parameters such as the milling time or the sintering temperature/time. Furthermore, the SEM evaluates the performance of catalyst layer for coking.

Figure 11:
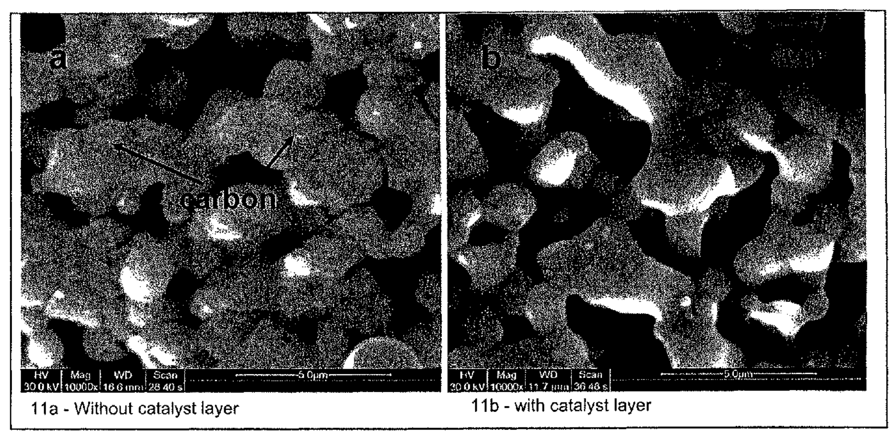
FIGS. 11*a-b* show SEM images illustrating preliminary results on the effect of catalyst layer on coking behavior, according to an embodiment of the present invention.

FIG. 11 shows preliminary results on the effect of catalyst layer on coking behavior. Comparison of the surface with and without catalyst layer clearly shows that the carbon deposits are significantly reduced with the use of the catalyst layer.

Example 9

This Example describes the design, development, and characterization of a meterable reactor that reforms hydrocarbon fuels to syn-gas in a highly controlled manner for the electro-chemical power generation in the AS-SOFC based flame fuel cell system. The exothermic reactor also provides the heat required for the SOFC operation.

All previous studies of FFC applications have employed simple combustors (e.g. Bunsen burner) operated in fuel-rich conditions. Despite its simple structure and ease of operation, such an "un-meterable" combustion system suffers from a large amount of heat loss to the surroundings and cannot control the product syn-gas composition by such an uncontrolled flame. The flames also produce a significant amount of particulates and carbon deposits to aggravate the coking problem. As described herein, a meterable reforming reactor utilizing a porous-medium reactor with heat recirculation was developed and characterized, which thereby achieved higher thermal efficiency, higher power density, and improved durability.

Combustion in porous media, namely the "filtration combustion," is a highly complex physical and chemical problem involving multi-phase reaction and transport, and is also relevant to a wide variety of practical applications, as reviewed in a comprehensive article. Combustion of gaseous fuels within a chemically inert matrix of porous media has been extensively studied due to the industrial needs of high performance radiant heaters. In a stationary porous burner, heat generation from the gaseous combustion is transferred to the neighboring solid by convection. Subsequently, solid porous medium with much higher conductive and radiative heat transfer rates transport part of the thermal energy to the region ahead of the primary flame zone. Therefore, the porous matrix essentially acts as an embedded preheater, allowing "superadiabatic" combustion temperatures, and thus improves flame stability near the rich and lean flammability limits.

More recently, filtration combustion inside an inert porous medium has been utilized as an effective non-catalytic partial oxidation of hydrocarbon for hydrogen (or more accurately syn-gas) production using simple hydrocarbon fuels such as methane and ethanol. Some recent studies explored more complex fuels and novel combustor configurations for improved heat recuperation.

An integrated AS-SOFC based flame fuel cell system with a heat-recirculating porous-medium reactor, is contemplated by the present invention, details of which will be described herein.

Identification of optimal configuration and operating conditions for the system requires extensive parametric studies through complementary modeling and experimental investigations. While previous studies provided valuable information about basic characteristics of porous-medium reactors, detailed understanding is still lacking in causal-effect relation between input parameters (e.g. net porosity and spatial distribution, conductive and radiative properties of the solid, inlet conditions) and the reactor performance (e.g. flammability limit, flame speed, product composition, conversion efficiency). In particular, previous studies reported that the propagation speed of flames within a porous medium can exist in a range depending on the specific flame position, in contrast to a unique definite flame speed for a freely propagating flame.

Example 10

Figure 12:
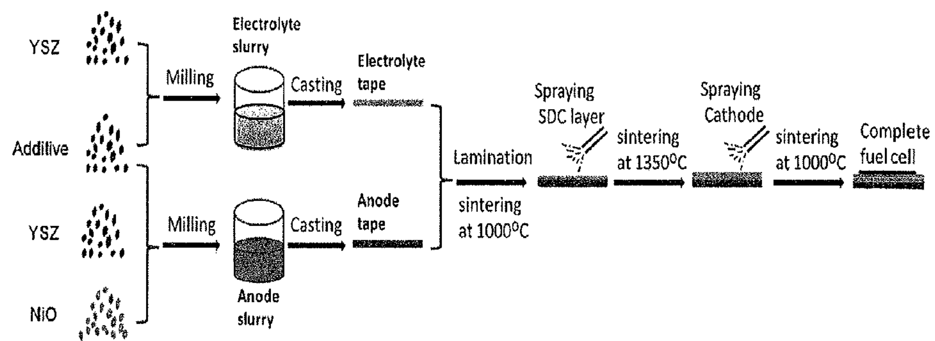
FIG. 12 is a schematic illustration of the preparation of a multilayer electrolyte AS-SOFC based FFC, according to an embodiment of the present invention.

This Example discusses the benefits of reducing the AS-SOFC based flame fuel cell's operation temperature, and ways of doing so (e.g., preparation of a multilayer electrolyte AS-SOFC-based FFC—see FIG. 12), in accordance with an embodiment of the present invention. Reduction of the AS-SOFC based flame fuel cell's operation temperature to intermediate-temperatures (650-850° C.) will greatly facilitate the commercialization of this technology because of the (1) possibility of using inexpensive metallic alloys as the interconnect, and (2) prolonged component lifetime at the reduced temperature. However, the ohmic resistance of the electrolyte and polarization resistance of the electrodes (especially the cathode) need to be reduced to achieve the reduction of operation temperature.

Example 11

This Example describes flame fuel cell power generation system 400 shown in FIGS. 14*a-d*. FIGS. 14*a-d* show a flame fuel cell power generation system, according to an embodiment of the present invention. The FFC, such as the anode supported SOFC based FFC described herein, can be integrated in a burner (e.g. cooking burner) to enable the generation of both electricity and heat from the fuel.

Figure 14A:
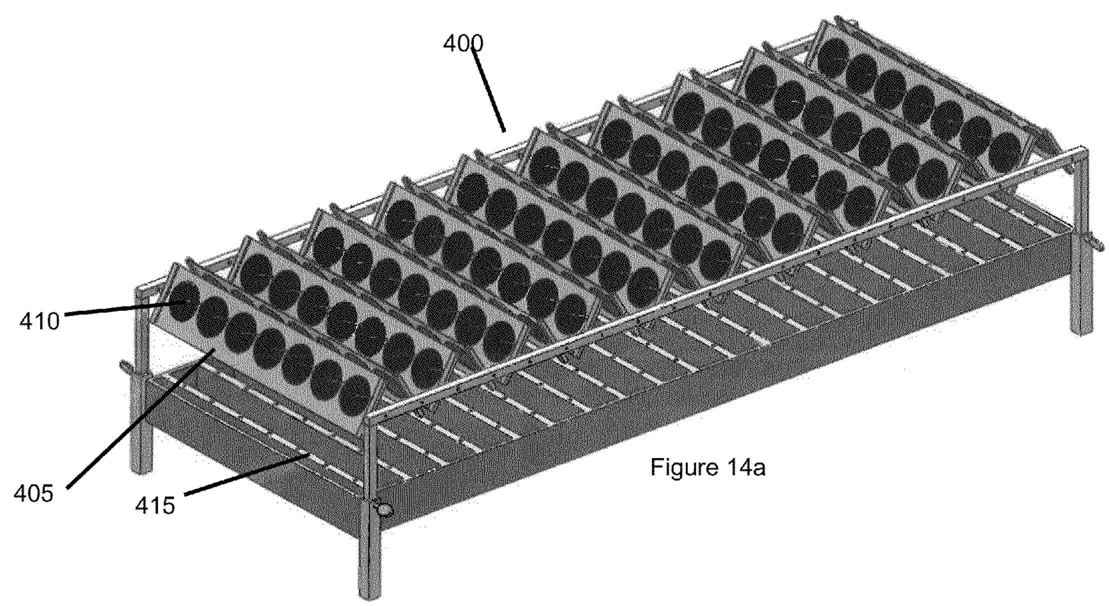
FIGS. 14*a-d* show a flame fuel cell power generation system, according to an embodiment of the present invention.
Figure 14B:
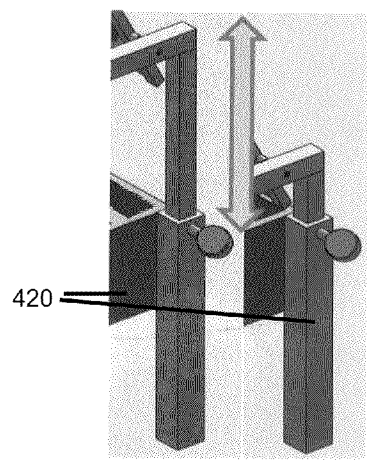
Figure 14C:
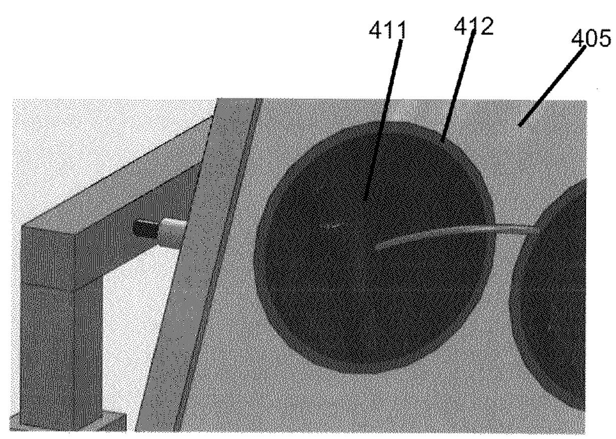
Figure 14D:
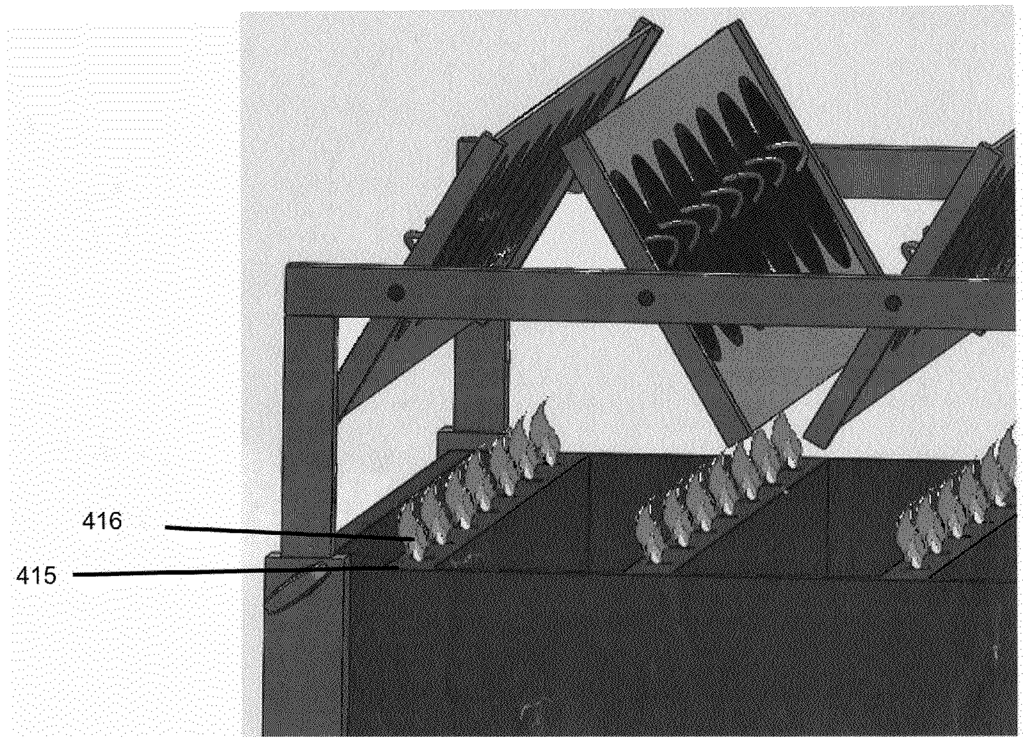

As shown, there are twenty angled FFC holders 405, each holder containing a FFC 410 stacked over a burners 415, which can use a butane cartridge for the operation. Each FFC contains an anode 412 and a cathode 411. The legs 420 of the flame fuel cell power generation system 400 are adjustable (FIG. 14*b*). Each burner 415 can include at least one flame nozzle, and more preferrably a number of flame nozzles to provide a flame for each individual FFC. The FFC can be used to light an LED light or run a fan, for example. Also, this fuel cell power generation system 400 can be used in a restaurant, home cooking burner, etc (e.g., while food is being, it can generate electrical power for lights and a fan for a dining table.)

Example 12

Multilayered Anode-Supported Solid Oxide Fuel Cell (AS-SOFC) for Flame Fuel Cell (FFC)

This Example describes a multilayered anode supported solid oxide fuel cell (AS-SOFC) for flame fuel cell, according to an embodiment of the present invention.

Conventional SOFCs use thick electrolyte-yttria stabilized zirconia (YSZ) which can supply the mechanical strength for the fuel cell. However, the operation temperature of such a configuration is around 1000° C. which introduces several issues like material degradation, sealing, system maintenance. Currently, to lower the operation temperature of fuel cell, one effective way is reducing the thickness of YSZ electrolyte which can significantly reduce the ohmic resistance of fuel cell. Thus, an anode-supported YSZ thin electrolyte SOFC is extensively investigated due to its durability, ease of fabrication and high performance [F. Zhao, A. V. Virkar, Journal of Power Sources 141 (2005) 79].

Several cathode materials have been adopted on the YSZ based SOFCs. Compare to the typical Sr-doped $LaMnO_3$ (LSM) cathode, some pevoskite materials such as LSCF ($La_{0.6}Sr_{0.4}Co_{0.2}Fe_{0.8}O_3$) [Z. G. Lu, X. D. Zhou, D. Fisher, et. al. Electrochemistry Communications 12 (2010) 179], BSCF ($Ba_{0.5}Sr_{0.5}Co_{0.8}Fe_{0.2}O_{3-\delta}$) [H. G. Shi, R. Ran, Z. P. Shao, Intl. Hydro. Energy, 37 (2012) 1125], have shown excellent performance due to their superior oxygen permeability and electro-catalytic activity. However, the interfacial reactions between YSZ and LSCF or BSCF have a negative effect on the fuel cell durability. For example, $SrZrO_3$ which is a non-conductive material is produced at high temperatures [A. Petric, P. Huang, F. Tietz, Solid State Ionics 135 (2000) 719].

Therefore, in order to eliminate these undesirable reactions, an interlayer (e.g. samaria-doped ceria (SDC)) is proposed to be introduced to avoid the direct contact between YSZ and these active cathode materials. Thus, a multilayered SOFC with five layers is formed with catalyst layer (discussed in Example 8 above), anode, electrolyte, inter layer and cathode, according to an embodiment of the present invention.

The ohmic resistance of the electrolyte can be minimized by either reduction of electrolyte thickness or adoption of new electrolyte materials with higher ionic conductivity than the traditional yttria stabilized zirconia (YSZ) electrolyte. An AS-SOFC based flame fuel cell with YSZ electrolyte is favorable because of its ease of fabrication, durability, and high performance. Among the several cathode materials that can be used for applications below 800° C., $Ba_{0.5}Sr_{0.5}Co_{0.8}Fe_{0.2}O_3$ (BSCF) is very promising due to its superior oxygen permeability and electro-catalytic activity relative to the conventional Sr-doped $LaMnO_3$ (LSM) cathode. However, BSCF has a significantly higher coefficient of thermal expansion (CTE) than the YSZ electrolyte, and reacts with YSZ to form $SrZrO_3$ at high temperatures. Therefore, a Sm— or Gd-doped ceria (SDC or GDC) can be introduced as an interlayer between the BSCF cathode and YSZ electrolyte to boost cell performance and eliminate possible reaction between BSCF and YSZ.

Prelim Test Results (One Example of Interlayer: SDC):

Anode-supported complete cells were prepared using a tape casting with wet spraying technique. YSZ, SDC, NiO+YSZ (60:40 w/w) and BSCF+SDC (70:30 w/w) were used as the electrolyte, interlayer, anode and cathode materials, respectively. NiO—YSZ anode-supported substrates with YSZ thin film electrolyte were fabricated by a tape-casting and lamination process. The green tape was cut into discs, sintered at 1200° C. for 2 h. The sintered substrate (15 mm in diameter) consisted of two layers: anode and electrolyte. A SDC interlayer was deposited on top of the YSZ electrolyte by using wet spraying method. Then, the substrate with SDC layer was sintered at different temperatures for 4 hrs. Following the deposition of cathode (0.7 $cm^2$) on the top of SDC layer, the complete cells were sintered at 1000° C. for 5 h.

To make a comparison, the performances of fuel cells with and without SDC layer were investigated. FIG. 15 is a graphical illustration of the performance of the fuel cell described in this Example without SDC layer. The results show that the peak power density is about 260 $mW/cm^2$ at 750° C. Such a value is reasonable for the LSM based SOFCs. However, BSCF has much higher catalytic ability than LSM which was supposed to achieve higher power density. Such a low power density indicates a strong undesirable reaction between YSZ and BSCF. It is well known that $SrZrO_3$ which is an insulating material is produced during sintering process, thus increase the fuel cell resistance resulting in the poor performance.

FIG. 16 is a graphical illustration showing the performance of a fuel cell with SDC layer (~3 μm), according to an embodiment of the present invention. Obviously, it shows much better performance than the fuel cell without SDC layer. The peak power density is about 1.57 $w/cm^2$. It indicates that SDC layer can effectively eliminate the reactions between YSZ and BSCF resulting in the dramatic enhancement on the fuel cell performance.

In FIG. 17, the results show that the resistance for the fuel cell without SDC (FWSDC) layer is even a little less than that of fuel cell with SDC (FSDC) layer. It is because additional SDC layer can increase the total resistance of fuel cell. However, the resistance of electrodes for the fuel cell without SDC (1.8Ω·$cm^2$ and 1.57Ω·$cm^2$ at 700° C. and 750° C.) is much higher than that of fuel cell with SDC (0.58Ω·cm2 and 0.41Ω·$cm^2$ at 700° C. and 750° C.). Since anode is unlikely to change too much by introducing a SDC layer, the reaction between YSZ and BSCF is most likely reason for such an increase of resistance.

FIG. 18 is a graphical illustration that shows the performances of fuel cells with SDC layer at 750° C. which were sintered at different temperatures from 1250° C. to 1450° C. As shown in the FIG. 18, the fuel cell performances increased firstly with increasing the sintering temperatures from 1250° C. to 1350° C., then decreased for the further increase of temperatures from 1350° C. to 1450° C. Low sintering temperatures could not achieve a dense electrolyte layer resulting in high ohmic resistance. It was about 2.1Ω·$cm^2$ for fuel cell sintered at 1250° C. Also, at the same time, even the sintering temperature is higher than 1200° C. which can introduce the undesirable reaction between YSZ and SDC, the reaction is moderate at this temperature which could not produce too much resistance for the fuel cell. Thus, the poor performance at the low temperature is mainly due to the un-dense electrolyte.

By increasing the sintering temperature from 1250° C. to 1350° C., the fuel cell performances were significantly improved from 0.38 $W/cm^2$ to 1.57 $W/cm^2$. It is due to the reduction of fuel cell ohmic resistance even though the reaction between YSZ and SDC cannot be neglected at this temperature. However, at the temperatures from 1350° C. to 1450° C., the fuel cell performance starts to drop from 1.57 $W/cm^2$ to 0.55 $W/cm^2$. Also, the ohmic resistance increased from 0.34Ω·$cm^2$ to 1.21Ω·$cm^2$.

In FIG. 18, since the I-V curves didn't show too much concentration losses, the possibility of concentration losses by increasing the sintering temperatures which may result in the fuel cell performance drop can be eliminated. Thus, the reaction between YSZ and SDC is the main reason for the performance drop.

In conclusion, the multilayer anode-supported SOFC described in this Example exhibits an extraordinary fuel cell performance of ~1.57 $W/cm^2$ by wet spraying a SDC layer onto YSZ layer. The fuel cell performance varied with the sintering temperature of fuel cell and thickness of sprayed SDC layer. At the low temperatures, the fuel cell resistance is mainly from the un-dense electrolyte. At the high sintering temperatures, the reactions between YSZ and SDC have a significant effect on the fuel cell performance.

Example Fabrication Methods

A number of advanced techniques have been developed to fabricate thin-film electrolytes for SOFC applications. Recently wet powder spraying, sometimes called as suspension spraying, has been applied for the facile fabrication of thin-film electrolytes. As a non-contact technique, it is suitable for flat substrates, corrugated sheets, tubes and a variety of other substrates and easy to scale up from laboratory to industrial fabrication.

Figure 13:
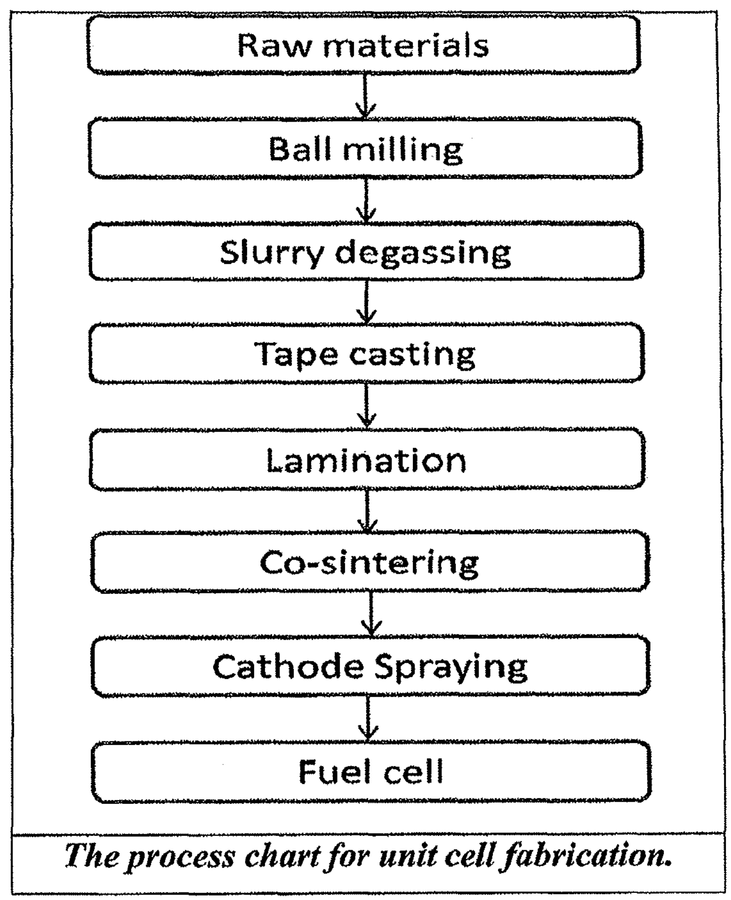
FIG. 13 is a chart showing the schematic fabrication process for an anode supported SOFC based FFC, according to an embodiment of the present invention.

FIG. 13 is a chart showing the schematic fabrication process for an anode supported SOFC based FFC, according to an embodiment of the present invention. This process chart of unit cell anode supported SOFC based FFC fabrication begins with raw materials, and then proceeds to ball milling, slurry degassing, tape casting, lamination, co-sintering, cathode spraying and final fabricated anode supported SOFC based FFC. Listed below is a non-limiting example of further specifics of the fabrication process.

Raw Materials (One Example of SOFC Based FFC):

The starting materials of the anode supported SOFC based FFC can be NiO, YSZ (8 wt. % yttria stabilized zirconia), and LSCF ($La_{0.5}Sr_{0.5}Co_{0.8}Fe_{0.2}O_{3-\delta}$). The tables below show fuel cell components, fuel cell materials, and slurry materials.

TABLE 1

Fuel cell components

| Fuel cell components | Materials | Weight Ratio |
|---|---|---|
| Anode | NiO + YSZ (TZ-8Y) | 6:4 |
| Electrolyte | YSZ (TZ-8YS) | pure |
| Cathode | LSCF + YSZ (TZ-8Y) | 7:3 |

TABLE 2

Fuel cell materials

| Product name | Vendor | Surface area (m2/g) | Particle size (μm) |
|---|---|---|---|
| NiO | J.T. Baker, USA | 2 | ~3 |
| YSZ (TZ-8Y) | Tosoh Co., Japan | 13.5 | ~0.1 |
| YSZ (TZ-8YS) | Tosoh Co., Japan | 6 | ~0.3 |
| LSCF | fuelcellmaterials.com USA | 5.5 | ~0.38 |

TABLE 3

Slurry materials

| Slurry components | Name | Ratio (wt. %) |
|---|---|---|
| Solvent | Ethanol | 11 |
| | Toluene | 16.2 |
| Binder | PVB (Polyvinyl Butyral ) | 3.8 |
| Surfactant | Blown Menhaden Fish oil | 1.3 |
| Plasticizer1 (p1) | Butyl Benzyl Phthalate | 1.9 |
| Plasticizer2 (p2) | Polyethylene | 1.9 |
| Powders | Anode or Electrolyte | 63.9 |

Ball Milling:

Milling Media

The milling media can be YSZ cylinders (Diameter: 9.5 mm; Length: 10 mm). The usual grinding media mill charge is about one third of mill volume.

Powder Drying

The fuel cell powders are dried and stored in an oven at 120° C. for two hours to remove the adsorbed moisture from the particles and from between particles.

Pre-Dissolved Solution

Toluene, ethanol and fish oil are premixed with the weight ratio of 300:30:22 to form a premixed solution (S1). PVB, P1 and ethanol are premixed with the weight ratio of 2:1:5 to form a premixed solution (S2).

For the Milling (Based on 400 g Anode Powders), Here is the Step:

The 400 g powders and 118 g S1 are put into the jar (1 L) with the milling media, then milled by using a jar milling machine with 80 rpm for 12 hours to get the pre mixed slurry (S3). After that, 96 g S2 and 12 g P2 are poured into S3 for another 12 hours milling to get the well dispersed slurry (S4). The next step is to deair the slurry to remove any air that may have been entrained during the milling and mixing process. So the S4 is poured into a stirring vacuum (vacuum pressure: ~15 psi) for degassing for 5 minutes to achieve the final slurry (S5) for tape casting.

Tape Casting:

As just one non-limiting example of a fabrication method for tape casting, the following parameters are set up: Casting speed: 20 cm per minutes, Doctor blade: dual blades made of stainless steel, Blade width: 20 cm, Carrier film: Mylar coated with silicon, Green tape thickness: 1 mm.

After setting up these parameters, the S4 is poured into reservoir to start the casting. Then, the green tape is left for drying for 24 hours. Repeat above step to get the electrolyte tape (about 10 micro).

Lamination:

As just one non-limiting example of a fabrication method, for lamination the following parameters are set up: The laminating temperature: 60° C., The laminating pressure force: 4 ton for a 10 $cm^2$ fuel cell, Cover media: mylar film, The laminating time: 5 minutes. The anode and electrolyte tape can be cut into any desired shape, and then laminate the two tapes using above settings to get the two layered tape (T1).

Co-Sintering:

As just one non-limiting example of a fabrication method, T1 is sintered at 1400° C. for 5 h with the heating rate of 2° C. to get bilayer fuel cell (T2).

Cathode Spraying:

Provided is just one example of a fabrication method. Cathode suspension: 5 g cathode powders with 95 g glycol are milled for 24 hours to get a cathode suspension. Cathode suspension is sprayed on the T2 by using a ultrasonic spraying machine, then the T2 with cathode are sintered at 1000° C. for 5 hours.

While several embodiments of the invention have been discussed, it will be appreciated by those skilled in the art that various modifications and variations of the present invention are possible. Such modifications do not depart from the spirit and scope of the present invention.

What is claimed is:

1. An anode supported solid oxide fuel cell based flame fuel cell comprising:

a. a catalyst layer, wherein a first side of said catalyst layer is exposed to a flame when said fuel cell is in operation;

b. an anode layer on a second side of said catalyst layer opposite the first side of said catalyst layer;

c. an electrolyte layer on the side of said anode layer opposite the side where said anode layer is on said catalyst layer;

d. a cathode layer on the side of said electrolyte layer opposite the side where said electrolyte layer is on said anode layer; and e. an interlayer between said cathode layer and said electrolyte layer, wherein said interlayer comprises a material selected from the group consisting of $Sc_2O_3$ stabilized $ZrO_2$ (ScSZ), Yttrium-doped barium zirconate (BZY), LSGM, SNDC, and $Y_2O_3$ stabilized $ZrO_2$ (YSZ).

2. The fuel cell of claim 1, wherein said catalyst layer comprises a catalyst material selected from the group consisting of Ru and Pt.

3. The fuel cell of claim 1, wherein said cathode layer comprises a material selected from the group consisting of BSCF, Sr-doped $LaMnO_3$ (LSM), LSF, SSC, BLC, LSC, LSCF, LSCM, LNF, and LNC.

4. The fuel cell of claim 1, wherein said electrolyte layer comprises a material selected from the group consisting of Samarium-doped ceria (SDC), Gadolinium-doped ceria (GDC), $Sc_2O_3$ stabilized $ZrO_2$ (ScSZ), Yttrium-doped barium zirconate (BZY), LSGM, SNDC, and $Y_2O_3$ stabilized $ZrO_2$ (YSZ).

5. The fuel cell of claim 3, wherein said cathode layer further comprises a ratio of a cathode material to an electrolyte material is between 50:50 and 90:10 w/w.

6. The fuel cell of claim 1, wherein said anode layer comprises a material selected from the group consisting of NiO, $Cu+CeO_2$, and LSCM ($La_{0.7}Sr_{0.3}Cr_{0.5}Mn_{0.5}O_{3-\delta}$).

7. The fuel cell of claim 6, wherein said anode layer further comprises a ratio of an anode material to an electrolyte material is between 50:50 and 90:10 w/w.

8. The fuel cell of claim 1, wherein said fuel cell does not comprise a chamber.

9. The fuel cell of claim 1, wherein said fuel cell operates with without cracking.

10. The fuel cell of claim 1, wherein said fuel cell is resistant to coking.

11. The fuel cell of claim 1, wherein said fuel cell utilizes a hydrocarbon and air mixture as a fuel source.

12. The fuel cell of claim 11, wherein said hydrocarbon is selected from the group consisting of gaseous fuels, liquid fuels, solid fuels, and biofuels.

13. The fuel cell of claim 12, wherein said hydrocarbon is selected from the group consisting of hydrogen, methane, butane, propane, gasoline, diesel, jet fuel, ethanol, methanol, wood, and coal.

* * * * *